M. D. KING.
Machines for Setting Tires.

No. 148,071. Patented March 3, 1874.

Witnesses.
D. R. Cowl
H. S. Miller

Inventor.
Marquis D. King,
By Atty. A. B. Stoughton.

AM. PHOTO-LITHOGRAPHIC CO. N.Y. (OSBORNE'S PROCESS.)

UNITED STATES PATENT OFFICE.

MARQUIS D. KING, OF KING'S FERRY, NEW YORK, ASSIGNOR TO HIMSELF AND SENECA G. POMEROY, OF SAME PLACE.

IMPROVEMENT IN MACHINES FOR SETTING TIRES.

Specification forming part of Letters Patent No. 148,071, dated March 3, 1874; application filed November 18, 1873.

*To all whom it may concern:*

Be it known that I, MARQUIS D. KING, of King's Ferry, in the county of Cayuga and State of New York, have invented certain new and useful Improvements in Machines for Setting Tires in a Cold State upon Wheels; and I do hereby declare the following to be a full, clear, and exact description of the same, reference being had to the accompanying drawings making a part of this specification, in which—

Figure 5:
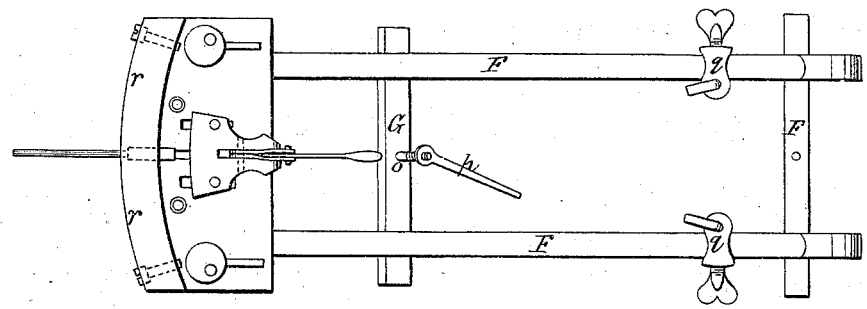
Figure 6:
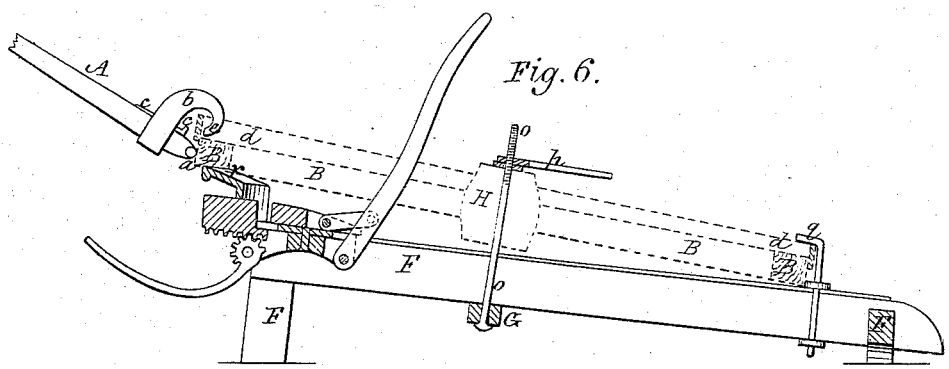

Figures 1, 2, 3, and 4 represent the tools or instruments in question; and Figs. 5 and 6 represent the means of upsetting and holding the tire and the wheel so that the tools or instruments may be applied, and are illustrated to show the entire operation, but constitute the subject-matter of a separate application for Letters Patent of even date herewith.

This invention relates to certain tools or instrumentalities by means of which a tire in a cold state may be set or forced upon a wheel, while the latter is supported, held, and adjusted while the tire is being so set upon it; and the invention consists, first, in an adjustable hook and lever, by which the rim of the wheel is pressed inward while the tire is being drawn over said rim. The invention further consists in a center clamp, which serves the double purpose of properly holding the wheel while the tire is being forced upon it, and for bringing the wheel to its proper form when too much dished, or when dished the wrong way. The invention further consists in movable back or tail clamps, for holding the tire and wheel diametrically opposite the point where the tire is being forced onto the rim of the wheel by the hooked lever. The invention further consists in a shield-block to aid in putting on and forcing down the tire upon the rim, or forcing up the rim into the tire, and at the same time preserving the wood of the rim from being torn or abraded in the last and most difficult part of the final forcing on of the tire.

To enable others skilled in the art to make and use my invention, I will proceed to describe the same with reference to the drawings.

Figure 1:
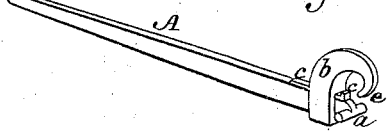

The hooked lever A in Fig. 1 is used for drawing down the tire upon the rim of the wheel, and its construction is such that the force applied through it tends to stretch or draw up the tire, and at the same time force inwardly the rim of the wheel. This lever A is constructed and operates as follows: The lever-handle itself may be straight, and upon its end there is made a broad and rounded fulcrum, $a$, which, when used, bears against the outer perimeter of the wheel, as shown in Fig. 6. On the lever or handle portion there is a hook, $b$, which can be moved on said handle, so as to adapt it to wheels of varied sizes, and, when properly adjusted, it is held firmly to the handle by a key, $c$, or its mechanical equivalent. The point $e$ of the hook is so curved or shaped as that, while the fulcrum $a$ bears against the rim of the wheel, as seen in Fig. 6, the point $e$ will come against the inner perimeter of the tire, the tire being represented in said figure by dotted lines at $d$, and the rim and wheel by similar lines at B; and thus the force applied through said lever-hook draws the tire one way and forces the rim the other way, enabling them to be brought together without marring the wood of the rim.

Figure 2:

At Fig. 2 is represented the shield-block, which consists of a block, C, of hard wood, or of iron, to which is fastened a thin steel plate, $f$. This shield-block is shown in place in Fig. 3, wherein B represents the rim or felly of the wheel, and $d$ represents the tire placed, or nearly so, thereon. D is a clamp, the under arm $g$ of which bears against the felly B, and the hand-screw $h$ in the upper arm $i$ of which bears upon the block C of the shield, while the steel plate $f$, which is quite thin, is between the tire and felly. The object and operation of these instrumentalities will be hereafter explained.

Figure 3:
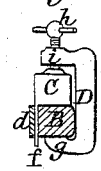
Figure 4:
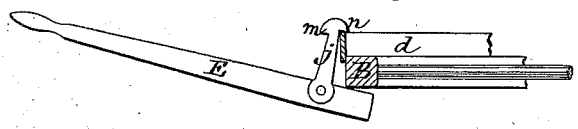

In Fig. 4 is represented a tool composed of a handle, E, and an arm, $j$, pivoted thereto. In the head of this pivoted arm are shoulders $m\ n$, at different distances from its center of motion, so as to be applicable to tires or wheels of different widths of tread. B is the felly, and $d$ is the tire. By this instrument, the tire may be set upon the rim, when they are free enough to come together without marring the wood; but when at the close, or nearly so, of the operation, the tire is very tight upon the wheel, and still not completely in its place, and likely to break away or chafe the wood of the felly by further forcing, then the instrument shown at Fig. 1 is substituted; and even this instrument, though quick in its application, will, when the tire is very tight, tear away the edge of the wood of the felly, and then the guard-block and clamp, Figs. 2 and 3, are used, so that the thin plate $f$ is interposed between the felly and the tire, and so that the pinching and binding of the tire, instead of coming upon the felly, comes upon the guard-plate, and so protects the wood from injury.

The frame or bed F, upon which the wheel B is held while the setting of the tire is being done, has connected to or with it a central clamp, composed of a cross-bar, G, through which a long screw-bolt, $o$, passes, said bolt passing through the bore of the hub H of the wheel, and, by means of this bolt $o$ and its lever-nut $p$, the wheel is brought back to its proper shape when too much dished, or dished the wrong way. The cross-bar G slides along under the rails of the frame or bed F, and can be adjusted to any ordinary carriage-wheel. Toward the rear of the frame or bed F there are two tail-clamps, $q\ q$, for securing the wheel to the bed at that part of it, said clamps being capable of adjustment to the wheel being tired. At the opposite end of the frame or bed F there is a support or table, $r$, upon which the wheel rests while the tire is being pinched or forced onto it; and it is at this point or part where the last and most difficult part of the operation is performed.

The tire is laid around the wheel as far as it will conveniently go without the forcing-tools, and then the tools are used to suit the fitting of the tire to the wheel, and so as not to damage the wood at the last point or part where the tire is finally brought to its place.

It will be perceived that, to avoid the expense of two machines, I have applied holding devices to the machine for upsetting the tire, for which I have made separate application for Letters Patent of even date herewith, thus making one frame or bed serve the purposes of the two operations.

Having thus fully described my invention, what I claim is—

1. The hooked lever, Fig. 1, composed of the lever A, fulcrum-bearing $a$, adjustable hook $b$, with its curved point $e$, when constructed so that the point of the hook will take against the inner perimeter of the tire, and the fulcrum $a$ against the outer perimeter of the felly, so as not only to stretch the former and contract the latter, but also to draw one upon the other by a single operation of the lever, as and for the purpose described and represented.

2. In combination with the frame or bed, the adjustable center clamp for holding the wheel by its hub, and the adjustable back or tail clamps $q$ for holding it by the rim, and table or support $r$, diametrically opposite said latter clamps, for not only holding the wheel while the tire is being set thereon, but for moving it on the frame around its real and true center.

3. In combination with the felly and tire of the wheel, and the device for bringing them together at the last and most difficult part of the operation, the shield-block $c\ f$, for facilitating the bringing of the wheel and tire together, and preventing the latter from injuring the wood of the felly, as described and represented.

4. The instrument shown at Fig. 4, composed of the lever E, pivoted arm $j$, with its graduated shoulders $m\ n$, arranged to bear under the felly B and over the tire $d$, so as to force up the former and draw down the latter by one and the same operation of the lever, as shown and described.

MARQUIS D. KING.

Witnesses:
L. B. KING,
E. P. SHAW.